US012465953B2

(12) United States Patent
Petric et al.

(10) Patent No.: US 12,465,953 B2
(45) Date of Patent: Nov. 11, 2025

(54) HAND-OPERATED PRESSURIZED-FLUID DEVICE

(71) Applicant: KOLEKTOR MOBILITY D.O.O., Idrija (SI)

(72) Inventors: Klemen Petric, Idrija (SI); Matija Crv, Idrija (SI); Jure Marinko, Logatec (SI)

(73) Assignee: KOLEKTOR MOBILITY D.O.O., Idrija (SI)

( * ) Notice: Subject to any disclaimer, the term of this patent is extended or adjusted under 35 U.S.C. 154(b) by 278 days.

(21) Appl. No.: 18/232,184

(22) Filed: Aug. 9, 2023

(65) Prior Publication Data

US 2023/0381830 A1 Nov. 30, 2023

Related U.S. Application Data

(63) Continuation of application No. PCT/EP2022/052530, filed on Feb. 3, 2022.

(30) Foreign Application Priority Data

Feb. 12, 2021 (DE) ..................... 10 2021 103 306.3

(51) Int. Cl.
*B05B 9/04* (2006.01)
*B08B 3/02* (2006.01)
*F04C 3/08* (2006.01)

(52) U.S. Cl.
CPC ............ *B08B 3/028* (2013.01); *B05B 9/0416* (2013.01); *B05B 9/0426* (2013.01); *F04C 3/08* (2013.01);

(Continued)

(58) Field of Classification Search
CPC ............ B08B 3/028; B08B 2203/0223; B08B 2203/027; B08B 2203/0294; B05B 9/01;

(Continued)

(56) References Cited

U.S. PATENT DOCUMENTS

| | | | | |
|---|---|---|---|---|
| 2,195,929 A * | 4/1940 | Klett | ..................... | B05B 9/0894 417/415 |
| 5,071,069 A * | 12/1991 | Stirm | ..................... | B08B 3/028 239/128 |

(Continued)

FOREIGN PATENT DOCUMENTS

| | | |
|---|---|---|
| CN | 201404879 Y | 2/2010 |
| CN | 207641700 U | 7/2018 |

(Continued)

OTHER PUBLICATIONS

International Search Report issued by the European Patent Office for International Patent Application No. PCT/EP2022/052530, dated May 4, 2022.

*Primary Examiner* — Darren W Gorman
(74) *Attorney, Agent, or Firm* — Myers Wolin, LLC

(57) ABSTRACT

A manually operated pressure fluid device has a housing structure which receives a motor-pump group and has a fluid inlet connected to the pump on the intake side and a fluid outlet formed on a nozzle unit and connected to the pump on the delivery side, an electrical power source and a control element acting on the power supply of the motor. The motor of the motor-pump group is a brushless DC motor and the pump is a whirling rotor pump having two lock washers, each having an annular face spline, where the number of teeth of the two face splines intermeshing with each other differ from each other by one and the lock washers arranged at an angle relative to each other wander relative to each other such that the face splines delimit a plurality of pump chambers which increase and reduce in size during pump operation.

16 Claims, 5 Drawing Sheets

(52) U.S. Cl.
CPC . *B08B 2203/0223* (2013.01); *B08B 2203/027* (2013.01)

(58) Field of Classification Search
CPC ..... B05B 9/0416; B05B 9/0426; B05B 9/085; B05B 9/0855; B05B 9/0861; B05B 9/0866; F04C 2/082; F04C 2/084; F04C 3/08; F04C 11/008; F04C 15/008
See application file for complete search history.

(56) References Cited

U.S. PATENT DOCUMENTS

| | | | | |
|---|---|---|---|---|
| 7,028,925 | B2 | 4/2006 | Guest et al. | |
| 9,808,817 | B2 * | 11/2017 | Luczak | B05B 9/0426 |
| 2014/0308151 | A1 * | 10/2014 | Nowitzky | F04C 18/084<br>418/204 |
| 2015/0217312 | A1 * | 8/2015 | Hines | B05B 11/1016<br>222/333 |
| 2016/0097388 | A1 * | 4/2016 | Nowitzky | H02K 1/278<br>417/420 |
| 2016/0236217 | A1 * | 8/2016 | Jenkins | A47L 11/4005 |
| 2018/0200743 | A1 * | 7/2018 | Dawson | B05B 15/14 |
| 2019/0283061 | A1 * | 9/2019 | Qiao | B08B 3/02 |
| 2021/0138499 | A1 * | 5/2021 | Hazel | B08B 3/026 |
| 2021/0346901 | A1 * | 11/2021 | Leifeste | B05B 11/0029 |
| 2021/0402422 | A1 * | 12/2021 | Kinne | B05B 5/1675 |

FOREIGN PATENT DOCUMENTS

| | | | | |
|---|---|---|---|---|
| CN | 207839479 | U | 9/2018 | |
| CN | 208800465 | U | 4/2019 | |
| CN | 110107495 | A | 8/2019 | |
| CN | 210753311 | U | 6/2020 | |
| CN | 110280518 | B | 7/2020 | |
| DE | 102004049630 | A1 | 4/2006 | |
| DE | 102012208511 | A1 | 11/2013 | |
| DE | 102014219219 | A1 * | 3/2016 | F01C 3/08 |
| DE | 102016215474 | A1 * | 2/2018 | F01C 21/02 |
| DE | 102017203521 | A1 * | 9/2018 | F04C 3/08 |
| EP | 0873199 | B1 * | 3/2004 | B08B 3/028 |
| EP | 3296021 | A1 | 3/2018 | |
| WO | 2010047800 | A2 | 4/2010 | |
| WO | 2012084289 | A2 | 6/2012 | |
| WO | WO-2018184659 | A1 * | 10/2018 | B05B 1/3046 |
| WO | 2020011153 | A1 | 1/2020 | |
| WO | 2020043032 | A1 | 3/2020 | |

* cited by examiner

HAND-OPERATED PRESSURIZED-FLUID DEVICE

CROSS REFERENCE TO RELATED APPLICATIONS

This application is a continuation under 35 U.S.C. § 120 of International Application PCT/EP2022/052530, filed Feb. 3, 2022, which claims priority to German Application No. 10 2021 103 306.3, filed Feb. 12, 2021, the contents of each of which are incorporated by reference herein.

FIELD OF THE INVENTION

The present invention relates to a hand-operated pressurized-fluid device, e.g. a pressurized-fluid spraying device or cleaning device, comprising a housing structure receiving a motor-pump group, a fluid inlet connected on the suction side to the pump, a fluid outlet connected on the pressure side to the pump and constructed on a nozzle unit, an electrical voltage source and at least one operator-control element acting on the power supply of the motor via the voltage source.

BACKGROUND

Pressurized-fluid devices that deliver a fluid jet from a corresponding nozzle are known in various designs and are used in particular for cleaning purpose. Particularly common versions are devices having a basic unit—provided with a fluid container as well as a motor-pump group (compressor)—and a manual spraying apparatus connected therewith via a pressure hose and provided with the nozzle as well as a handle. Typically, this nozzle is disposed at the end of a lance. In this regard, U.S. Pat. No. 7,028,925 B2 is to be cited by way of example. Also known, although heretofore less common, are generic hand-operated pressurized-fluid devices in which the motor-pump group is part of the respective hand-held device. This motor-pump group sucks in fluid via the fluid inlet, which typically communicates via a (suction) hose with a fluid reservoir (e.g. pail, canister, etc.). Concerning the prior art, DE 10 2004 049 630 A1, CN 208800465 U, CN 110107495 A, CN 201404879 Y, CN 207839479 U, CN 2107753311 U, WO 2020043032 A1, WO 2020011153 A1, CN 110280518 B and CN 207641700 U are to be cited by way of example in this respect.

WO 2020011153 A1 discloses a generic hand-operated pressurized-fluid device, in which a three-piston axial piston pump is driven by a geared electric motor constructed as a high-speed machine.

From DE 10 2012 208 511 A1, a device for conveying liquid or pasty fluid is known in which the rotor of a wobbling-rotor pump can be rotated exclusively by muscle power of an operating person. For this purpose, the pump rotor can be moved in forward and back rotation via a shaft, especially by such a hand-drive apparatus, which comprises two movable grip elements, which can be moved relative to one another and act via toothed racks on a pinion connected with the shaft.

Compared with the pressurized-fluid devices mentioned in the first place and having a basic unit separated from the hand-held spraying device, hand-operated pressurized-fluid devices known heretofore of the generic type mentioned in the second place have practical disadvantages in terms of handling. This is so because both the motor-pump group and the voltage source are part of the hand-held device, which is much heavier than the hand-held spraying apparatus of the pressurized-fluid device mentioned in the first place. This shortens the period of time within which fatigue-free working is possible. In addition, the integration of the motor-pump group into the hand-held device leads to vibrations of the latter. This also is detrimental to fatigue-free operation.

SUMMARY

The present disclosure has set itself an object of creating a remedy here. In particular, an intention is to provide a hand-operated pressurized-fluid device of the generic type that is improved with respect to handling compared with the prior art.

This object may be achieved according to the present disclosure in that, in a generic hand-operated pressurized-fluid device, the motor of the motor-pump group is constructed as a brushless direct-current motor and the pump is constructed as a wobbling-rotor pump having two toothed plates respectively provided with an annular spur gearing, wherein the numbers of teeth of the two spur gearings meshing with one another differ by 1 from one another and the toothed plates disposed at an angle to one another wander relative to one another in such a way that the spur gearings bound several pump spaces that become larger and smaller (wander) during pump operation. By use of the motor-pump group adopted according to the disclosure and characterized by the combination of a specific electric motor with a specific pump, it is possible to provide a hand-operated pressurized-fluid device having excellent and heretofore unattainable practical utility. Specifically, the hand-operated pressurized-fluid device is characterized by extremely quiet running. It works practically free of vibrations. And, in fact, not only are vibrations and oscillations induced by the motor-pump group substantially smaller than in devices—usually working with axial piston pumps—according to the prior art. To the contrary, such vibrations attributed to pulsing of the fluid (especially fluid jet or fog) exiting the nozzle are decisively smaller than in known generic hand-operated pressurized-fluid devices. This is, specifically in combination with one another, an extreme advantage for fatigue-free handling of the hand-operated pressurized-fluid device. In addition, the specific construction of the motor-pump group—compared with the prior art—permits a substantial reduction of the weight of the hand-operated pressurized-fluid device. A contributing factor to this is also the particularly high efficiency of the motor-pump group, on the basis of which a relatively small (lightweight) battery is sufficient for a specified duration of use or operation. In combination with the extremely low vibrations during operation of the device, uniquely favorable operating characteristics result from this. As an additional advantage, the motor-pump group used also permits stable, at least largely pulsation-free operation of the pressurized-fluid device—having the favorable operating characteristics mentioned in the foregoing—within a broad bandwidth of different fluid throughputs. Thus such pressurized-fluid devices may also be provided with which—for example for fine application of disinfectants on surfaces—homogeneous, finely atomized mists can be dispensed. And, furthermore, it is particularly advantageous that the pump used is reliably self-priming, which is a great advantage for feeding—possibly via a lengthy hose—the pressurized-fluid device from a pail, canister or the like disposed far underneath it.

The wobbling-rotor pump used in connection with embodiments of the present invention can be built according to two different concepts. On the one hand, it is a consideration that the two toothed plates of the pump are constructed with rotating ability, wherein one toothed plate is rotationally coupled with the motor in driving relationship and one toothed plate is thereby caused to move in rotation in driven relationship. A wobbling-rotor pump according to this concept can be inferred, for example, from WO 2005/116403 A1, WO 2010/018053 A1 and WO 2012/084289 A2. The disclosure in German Patent Application 10 2020 124 825.3 (which was still pending as of the priority date of the present patent application) also relates to such a double-rotor wobbling-rotor pump. On the other hand, one of the two toothed plates can be constructed as a stator and the other as a rotor rolling in wobbling manner on this, wherein the motor acts via a wobbling head on the rotor, in that the wobbling head having its end face inclined relative to the axis of rotation of the wobbling head bears on the rotor on its side facing away from the spur gearing (see, for example, DE 10 2014 219 219 A1, WO 2015/090730 A1, US 2016/0097388 A1 and WO 2018/054622 A1). The first-mentioned of these variants (double-rotor concept) is superior to the variant mentioned in second place (TMC concept) in terms of some operating characteristics of particular interest here. Specifically, this applies for the dispensing of fluids, which is still very largely pulsation-free at low or even very low throughputs. On the other hand, the TMC concept has advantages in terms of overall size, especially in pressurized-fluid devices designed for high throughputs. Thus the actual choice in the individual case depends on the objectives being specially pursued individually.

If the wobbling-rotor pump is constructed according to the TMC concept, then, according to a particularly preferred further embodiment of the invention, the motor-pump group is built into the housing structure in such a way that the motor faces the fluid outlet. In contrast, the pump of this motor-pump group faces the user when he or she is holding the pressurized-fluid device in the manner intended. This is advantageous not only from the viewpoint of optimum weight distribution that favors fatigue-free operator control. To the contrary, such a configuration is also favorable in terms of possibilities for configuring a device capable of high power and having particularly compact dimensions. Within the scope of this further development, it is further quite particularly advantageous when the motor has a continuously hollow motor rotor, the hollow space of which is part of the flow pathway connecting the pump outlet with the fluid outlet.

Among other considerations, it is possible in this way to ensure particularly effective cooling of the motor from the inside, so that bulky external cooling elements are not needed.

On the other hand, if the wobbling-rotor pump is constructed according to the double-rotor concept, then, according to a particularly preferred further embodiment of the invention, the motor-pump group is built into the housing structure in such a way that the pump faces the fluid outlet. In particular, the motor-pump group can comprise a motor housing provided with a motor stator and a pump housing connected sealingly therewith and provided with the pump inlet and the pump outlet, wherein especially a fixed journal, which extends through the driven toothed plate, the driving toothed plate and (at least partly) the motor rotor, can be connected with the pump housing. This journal can function as a bearing journal for the rotary bearing of the motor rotor and/or of the driving toothed plate. Particularly preferably, however, bearing—constructed as a sliding bearing—of the driving toothed plate or of the first pump rotor comprising this takes place directly in a corresponding receptacle of the pump housing, wherein a (narrow) annular gap remains between the journal and the first pump rotor. In the sense of a high degree of integration, the motor rotor and the first pump rotor can then be joined as a rigid structural unit, so that the motor rotor does not need any separate bearing of its own. In this way, particularly compact motor-pump groups having very quiet running can be obtained with very little structural complexity. In this case, a (narrow) annular gap, through which especially pressure equalization of the inner chamber of the motor housing can take place, can also remain between the motor rotor and the journal. The pressurized-fluid device can also be further optimized by a high degree of integration to the effect that an integrated housing structure of the motor-pump unit ensures not only functions of motor stator and/or motor housing but also functions of the pump housing; this is so because the minimization of weight achievable in this way favors the ease of handling.

Regardless of which of the two wobbling pump designs is used in the individual case, it is particularly advantageous when the motor rotor acts directly on the toothed plate of the wobbling-rotor pump driven by it. In the case of use of a wobbling-rotor pump according to the double-rotor concept, this means that the motor rotor and the toothed plate driven thereby always rotate with identical rpm, i.e. no type of gear mechanism is provided that brings about step-down or step-up ability or other influence on the rpm conditions. Such omission of a gear mechanism acts advantageously not only on the weight of the pressurized-fluid device but also on the quietness of running. In turn, the comfortable ease of handling over a long duration benefits from this.

Specifically when the pressurized-fluid device—as regards excellent ability for dosing the quantity of fluid delivered via the nozzle unit (see above)—is provided via a wobbling-rotor pump according to the double-rotor concept, preferably at least one sensor recording the pump rpm is assigned to the pump. In this respect, it is particularly advantageous for at least one Hall sensor to be implemented in the pump housing in such a way that it records the rpm or rotational position of the driving toothed plate and/or of the driven toothed plate.

For fatigue-free handling of the hand-operated pressurized-fluid device, its housing structure is particularly preferably provided with a grip structure, which projects obliquely backward and downward from the rest of the housing structure. It is then particularly favorable when an imaginary centerline of the grip structure encloses an angle of between 100° and 110° with the axis of the nozzle unit. In the interests of optimum ease of handling, it is then further advantageous when the voltage source is expediently a rechargeable battery is disposed on the grip structure at its lower end. In this way a particularly well-balanced device is obtained. Expediently, this voltage source is removable; thus it can be charged at an external charging station, and the pressurized-fluid device can be equipped with voltage sources of different size and capacity depending on need and application.

As regards diverse usability of the hand-operated pressurized-fluid device over a broad bandwidth of possible applications (e.g. for cleaning tasks, for spray application of chemicals and/or other substances on surfaces, for application of plant protecting products in agricultural crops, etc.), the nozzle unit is preferably adjustable and has several differently constructed nozzles, of which one respectively can be coupled fluidically with the pressure outlet of the pump. By means of suitable geometries of the various nozzles, different spatial patterns (e.g. strong jet, flat fan, conical spray, droplet cloud, mist, etc.) can be imposed on the fluid exiting the nozzle unit. The fluid outlet of the hand-operated pressurized-fluid device can also be part of a nozzle insert received exchangeably in a nozzle receptacle and fixed therein (for example via a bayonet fitting or a screw thread). For typical users of the device, a mixed form is favorable in such a way that its integrated nozzle unit has two or three specified different standard nozzles capable of being selectively activated as well as an additional port (nozzle receptacle) that can be activated alternatively for individual special nozzles.

If in the foregoing sense the nozzle unit of the hand-operated pressurized-fluid device has a multiplicity of selectively activatable nozzles of different geometry, it is further very advantageous when the respective momentary setting of the nozzle unit is recorded and a corresponding signal is sent to the device controller; this is so because—by acting, for example, on the rpm of the motor of the motor-pump group, specifically in the form of suitable limitation of rpm—the fluid throughput can be matched optimally to the respective nozzle being used.

According to yet another preferred embodiment of the present invention, the operator-control element acting on the power supply of the motor of the motor-pump group further acts also on a shutoff valve, which is disposed in the flow pathway between fluid inlet and fluid outlet. This shutoff valve—disposed in the said flow pathway, preferably upstream from the pump—is particularly preferably coupled mechanically with the operator-control element and upon actuation of the operator-control element opens immediately. In a preferred alternative configuration, the shutoff valve is actuated by means of an electrical actuator (e.g. an electromagnet), which—upon actuation of the operator-control element—is energized with current in parallel with the pump. Such a shutoff valve is particularly useful when a pre-pressure is present at the fluid inlet, for example during connection of the pressurized-fluid device to the domestic water network. Even in the case of unpressurized supply of the pressurized-fluid device with fluid, however, for example by feeding it from a canister, the said shutoff valve can be advantageous; this is so because, if the shutoff valve is closed in the absence of actuation of the operator-control element, fluid still present in the device during interruption of use is prevented from exiting the inlet or outlet side of the device—depending on the orientation in which the device is laid down. This can be particularly important during use of the hand-operated pressurized-fluid device with chemicals (see below).

This said shutoff valve can be constructed if necessary as a proportional valve, the passage cross section of which depends on the respective position of the operator-control element for the quantity being conveyed. This is the case in particular when the motor-pump group also can be controlled proportionally with respect to rpm/conveying rate by means of the operator-control element. The situation is analogous when, according to another preferred embodiment of the invention, a control knob or control slider—especially disposed on the housing structure—is provided, by the adjustment of which the rpm of the motor can be preset with a motor-pump group capable of operation with variable fluid throughput. Here also, when the operator-control element is actuated and thus the motor-pump group is in conveying mode, the position of a shutoff valve constructed as a proportional valve, i.e. its open cross section, can be predetermined in dependence on the setting applied by the control knob or control slider and thus on the conveyed output of the motor-pump group.

As regards the very broad bandwidth—measured against the prior art—for the use of the hand-operated pressurized-fluid device, it is to be emphasized that the pump being used is suitable due to its specific design type for conveying a plurality of various fluids, which differ in particular in terms of their physical and chemical properties. In order to utilize this potential, yet another preferred further embodiment of the present invention is characterized in that the fluid-carrying components of the hand-operated pressurized-fluid device are resistant to acids and bases. Particularly suitable materials for—depending on concept (see above)—the two pump rotors or the pump rotor and the pump stator are polymer plastics based on PEEK and/or PPS.

According to yet another preferred further embodiment of the present invention, an optical indicator, which in particular preferably comprises a display, is disposed on the housing structure in a manner facing the controlling operator. The indicator in question is then able to inform especially the user about the remaining capacity of the voltage source or remaining operating time of the hand-operated pressurized-fluid device. Another features that is very beneficial for the practical utility of the pressurized-fluid device is the arrangement of the light source on the housing structure such that it emits in the outlet direction of the pressurized fluid. Quite particularly preferably, this light source is disposed on the underside of the housing structure between a grip structure and the nozzle unit. This permits illumination of the working area with only minimum impairment of the view of the controlling operator toward the working area by reflection of light at the fluid exiting the nozzle unit. It is further favorable for maximum practical utility when the housing structure has an impact-damping surface coating on exposed regions, i.e. especially at protruding corners and edges.

In view of the shown target applications, the hand-operated pressurized-fluid device is preferably constructed to be splashproof. Thus the housing structure preferably meets the IP54 standard, especially by appropriate sealing of the intersecting and connecting faces of several housing elements. Likewise, the built-in components themselves (motor-pump group, electronics, operator-control elements, etc.) are watertightly encapsulated, potted or the like. And specifically, in the region of a removable voltage source (battery), a seal that protects the electrical contact connection from moisture and/or chemicals is provided at the place where this is fastened on the housing structure.

BRIEF DESCRIPTION OF THE DRAWING

The present invention will be explained in more detail hereinafter on the basis of two preferred exemplary embodiments illustrated in the drawing, wherein.

DETAILED DESCRIPTION OF THE PREFERRED EMBODIMENTS

Figure 1:
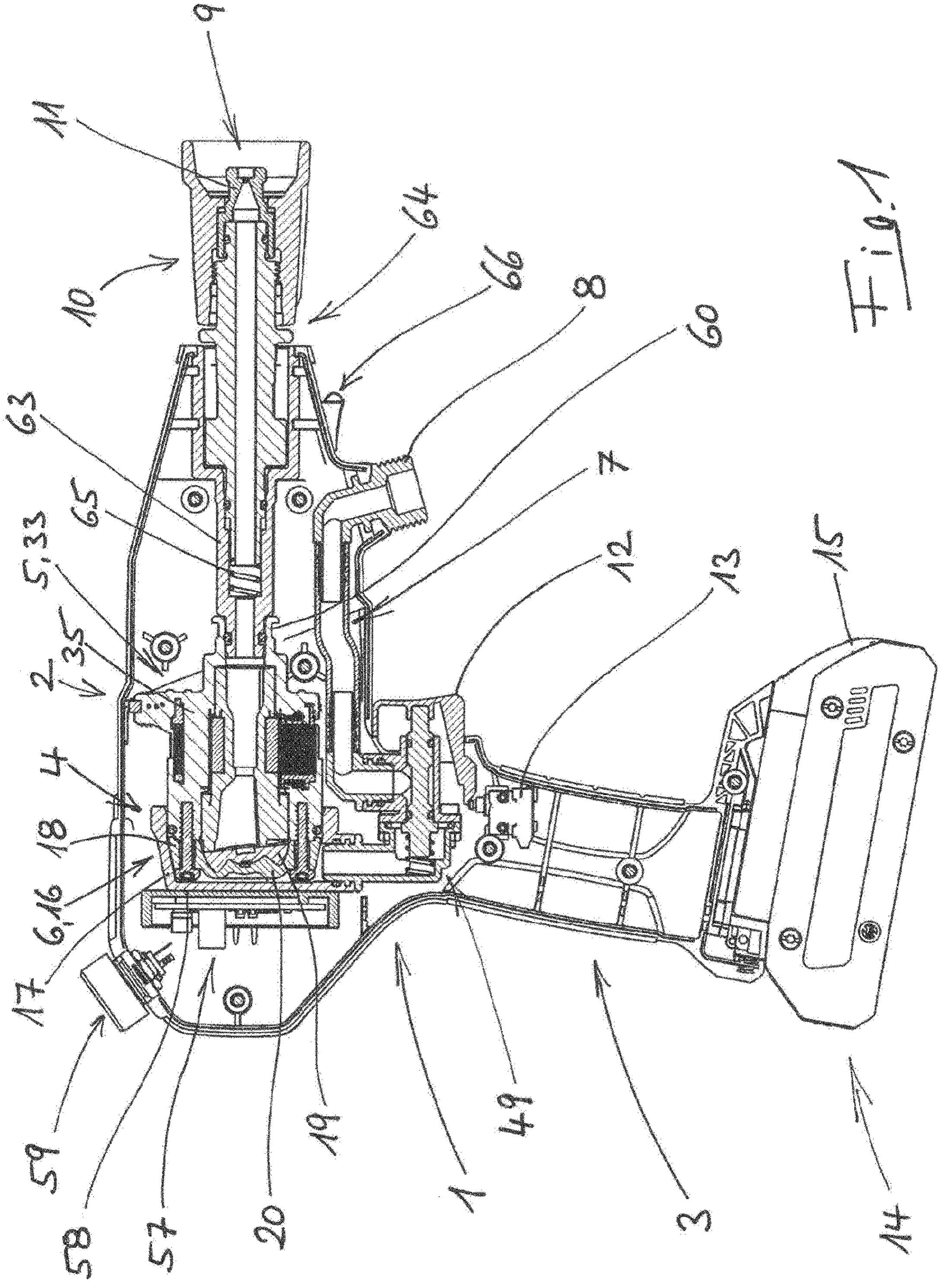
FIG. 1 shows a vertical section through the complete hand-operated pressurized-fluid cleaning device according to a first exemplary embodiment.
Figure 2:
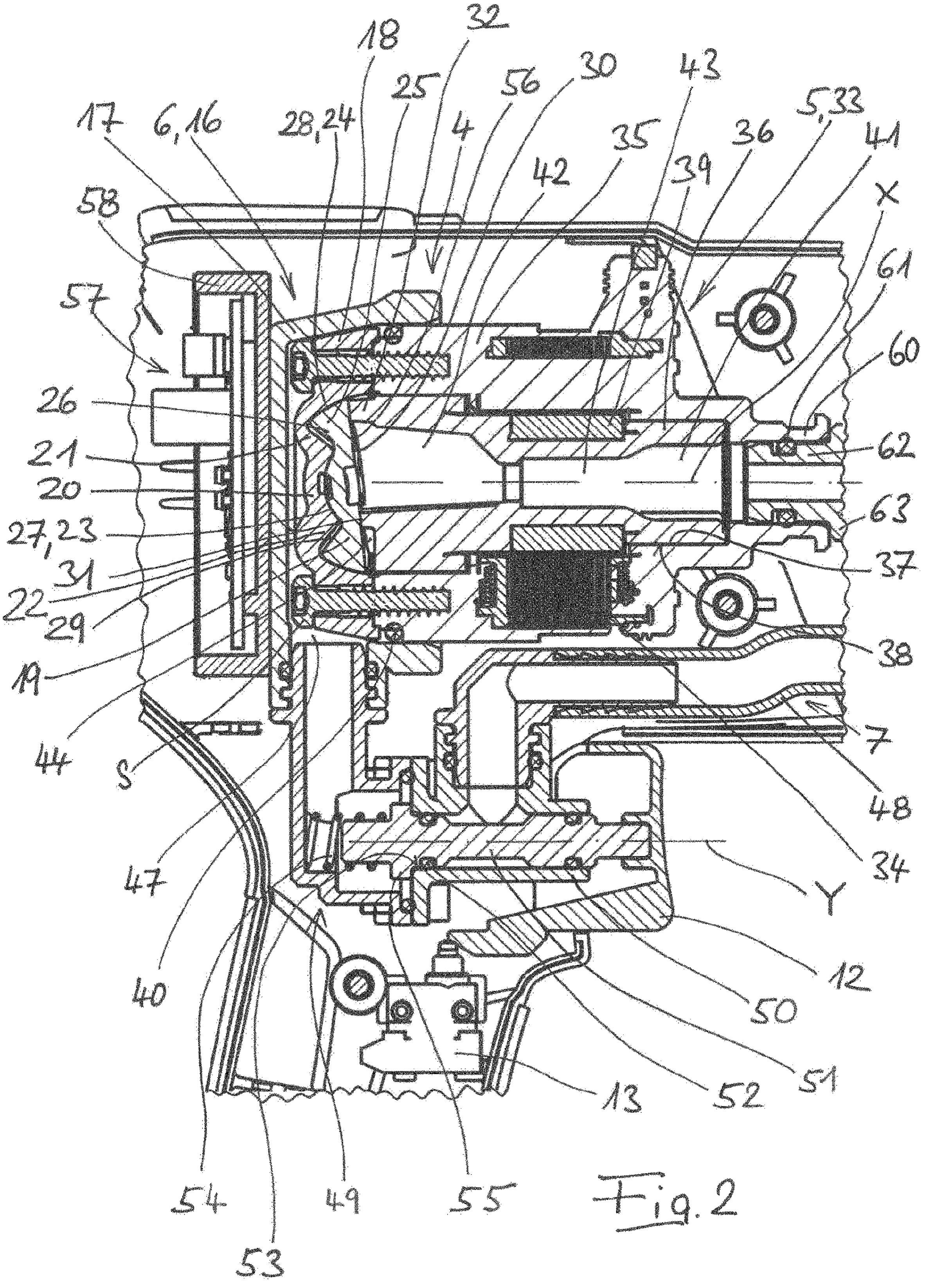
FIG. 2 shows a section of the same in an enlarged detail diagram and FIG. 3 shows a region of the pump of the motor-pump group in detail according to another sectional diagram; and, furthermore.
Figure 3:
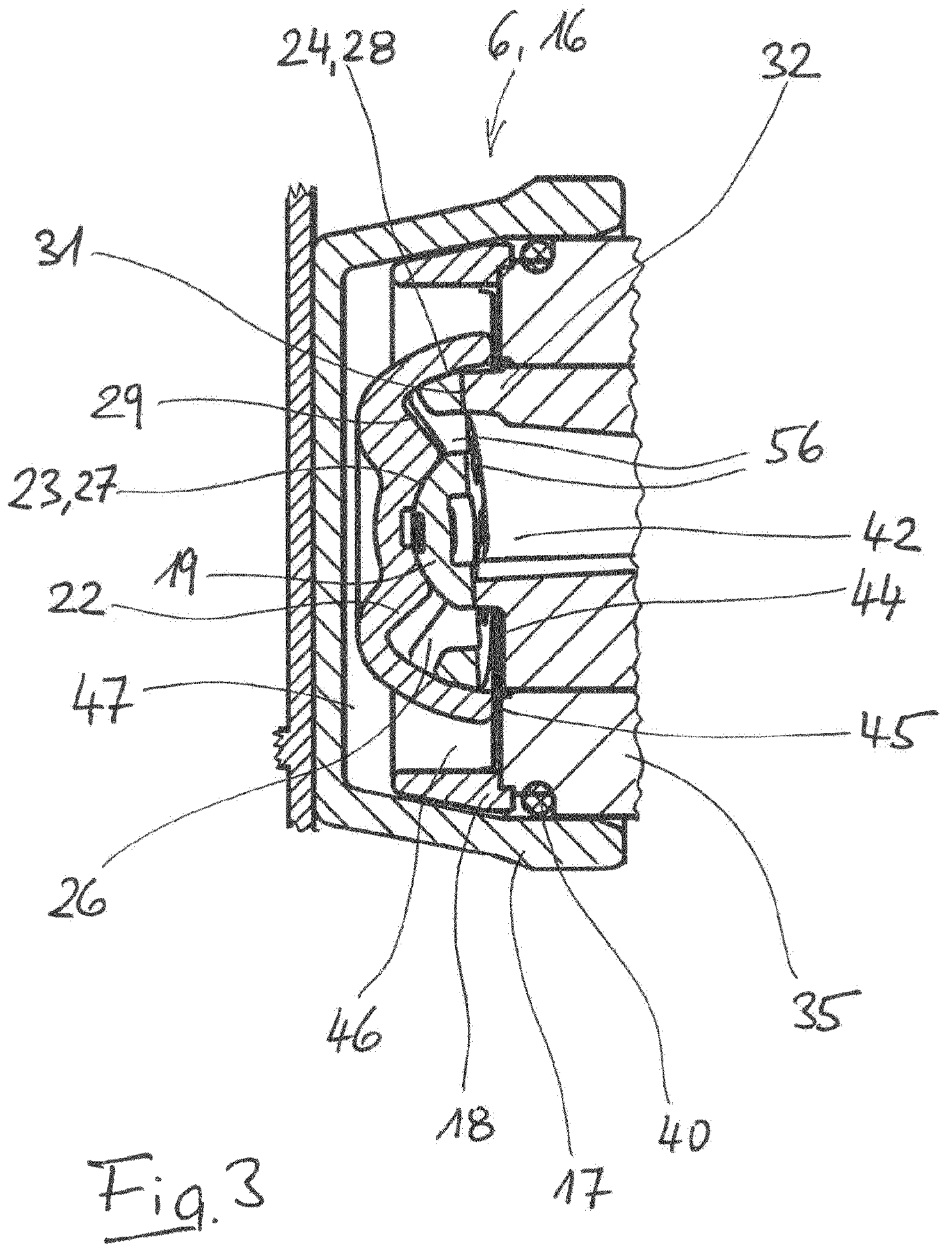

The pressurized-fluid cleaning device, illustrated in FIGS. 1 to 3 of the drawing, according to the first exemplary embodiment, comprises a housing structure 1 consisting of plastic with a main body 2 and a handle structure 3 projecting obliquely downward and backward therefrom. Main body 2 of housing structure 1 receives a motor-pump group 4, which comprises a direct-current electric motor 5 and a pump 6 driven thereby and suitable for conveying fluid. A fluid inlet 8, which is disposed on the underside of main body 2 in front of grip structure 3, is connected on the suction side—via an intake duct 7—of pump 6. On the pressure side, a fluid outlet 9 is connected fluidically to pump 6. This is part of a nozzle unit 10 with—functioning as a defined jet generator—a nozzle 11. An operator-control element 12, which acts—by means of a switch 13 actuated by it—on the power supply of motor 5 of motor-pump group 4 from a voltage source 14 in the form of a battery pack 15 disposed exchangeably at the lower end of grip structure 3, is disposed on grip structure 3, on its front side.

Since the illustrated pressurized-fluid device corresponds to the prior art (see the documents mentioned in the introduction) as far as the fundamental configuration features and technical viewpoints alluded to in the foregoing are concerned, more detailed explanations in this regard are unnecessary.

In a departure from the said prior art, pump 6 of motor-pump group 4 is constructed as a wobbling-rotor pump 16, and specifically—in the first exemplary embodiment shown in FIGS. 1 to 3—in the single-rotor or TMC version. It comprises a pump housing 17, a pump stator 18 of substantially approximately shell-like geometry disposed therein and a pump rotor 19 received therein. The bottom 20 of this pump stator 18 forms a first toothed plate 21 having an annular first spur gearing 22, which is bounded radially inwardly and radially outwardly respectively by an annularly closed primary sealing receptacle 23, 24 having a (concave) spherical surface. And the pump rotor 19 forms a second toothed plate 25 having an annular second spur gearing 26, which is bounded radially inwardly and radially outwardly respectively by an annular secondary sealing face 27, 28 having (convex) spherical geometry complementary to the corresponding surface of the respectively associated primary sealing receptacle 23 or 24. The numbers of teeth of the two spur gearings 22 and 26—meshing with one another—differ by one from one another, whereby several pump spaces 29 are bounded in the region of the two annular spur gearings 22, 26 between pump stator 18 and pump rotor 19—which is always inclined relative to pump stator 18 with an angle defined by the geometry of the two gearings 22, 26. Because end face 31 of a rotating wobbling head 32 slides on rear face 30 of pump rotor 19 and is obliquely oriented relative to pump stator 18 in a manner corresponding to the angle of inclination of pump rotor 19, pump rotor 19—while wobbling head 32 is rotating—is forced into a wobbling motion while rolling over pump stator 18. Because the two spur gearings 22 and 26 differ by one in the number of teeth, this pump rotor 19 wanders by one additional tooth over spur gearing 22 of pump stator 18 during one complete revolution of wobbling head 32. In the process, pump spaces 29 enclosed between the two annular spur gearings 22 and 26 become rhythmically larger and smaller during one complete revolution in pumping mode. As regards further details, reference is made to the initially mentioned prior art concerning TMC wobbling-rotor pumps.

Motor 5 of motor-pump group 4—which is built in with its motor 5 in an orientation facing fluid outlet 9—is constructed as a brushless direct-current motor 33. It comprises a motor stator 35, which has a coil arrangement 34 and with which pump stator 18 is securely connected by means of screws S, and a motor rotor 36, which is received in rotational relationship around axis X in the inner chamber 37, provided for this purpose, of motor stator 35, and is equipped on its circumferential face 38 with permanent magnets 39. Pump housing 17 is mounted on motor stator 35 in a manner sealed by means of annular seal 40. The end of motor rotor 36 on the pump side, i.e. illustrated on the left, is constructed as wobbling head 32 (see above), which in the present case is therefore an integral part of motor rotor 36. Motor rotor 36 has, passing through it over its entire length, a hollow space 41, which at end face 31 of wobbling head 32 leads into a control opening 42 on the pressure side and forms a pressurized-fluid duct 43, which is part of the flow pathway connecting the pump outlet with fluid outlet 9.

A suction-side control cavity 44, likewise constructed on the end face 31 of wobbling head 32, communicates with an annular space 45, which is formed between pump stator 18 and motor stator 35, i.e. its end face, and which in turn communicates, via a plurality of suction fluid ducts 46 passing through pump stator 18, with the pump suction space 47 defined between pump housing 17 and pump stator 18. A suction line 48 extending between fluid inlet 8 and pump suction space 47 leads into the latter. Therein a shutoff valve 49 is integrated with a valve housing 50, in which a valve spindle 51 is received in a manner displaceable along its axis Y. An O-ring 52 provided on valve spindle 51 cooperates—in the shown shutoff position—sealingly with a bore 53 of valve housing 50. A closing spring 54 acts on valve spindle 51 in the sense of the shutoff position, which is defined by a shoulder 55 constructed on valve spindle 51 and cooperating with a stop constructed on valve housing 50. Operator-control element 12, which actuates switch 13, also acts at the same time on valve spindle 51 in such a way that shutoff valve 50 opens when motor 5 of motor-pump group 4 is energized with current and starts to run. In an alternative configuration, construction of the shutoff valve as a seat valve that closes under pre-pressure on the entrance side would obviously also be possible.

Via ducts 56, which pass through pump rotor 19 and in the region of spur gearing 26 on the rotor side respectively lead to openings between two teeth, pump spaces 29 respectively communicate alternately during rotation of wobbling head 32 with (suction-side) control cavity 44 and (pressure-side) control opening 42, wherein the pump spaces 29 that are becoming larger—due to the wobbling motion of pump rotor 19—communicate with control cavity 44, as do the pump spaces that are becoming smaller with control opening 42.

The conveying capacity of motor-pump group 4 is adjustable. For this purpose a power electronics 57 unit is used, which is mounted for protection in a shell-like receptacle 58, which in turn is mounted on the outer side of pump housing 17 via a large heat-conducting surface area. Thus effective cooling of power electronics unit 57 takes place by means of the fluid flowing through pump housing 17. A power control knob 59, which is disposed—facing the controlling operator—on top of main body 2 of housing structure 1, acts on power electronics unit 57.

The end region of motor stator 35 facing away from pump 6 has a muff into which the connecting region 62, sealed by means of sealing ring 61, of a nozzle receptacle 63—received in main body 2 of housing structure 1—is inserted. Nozzle receptacle 63 functions for exchangeable mounting of nozzle inserts 64, which are provided with various application-specific, different nozzle units 10 and which can be fixed, for example, to nozzle receptacle 63 by means of a bayonet fitting pre-loaded by means of spring 65.

On the underside of main body 2 of housing structure 1, directly in front of fluid inlet 8, a light source 66 is disposed—in working direction—that emits in the outlet direction of the pressurized fluid. Due to the acid-resistant and base-resistant construction of all fluid-carrying components, the pressurized-fluid cleaning device is suitable for a plurality of applications. In particular, it can also be used in the area of industrial applications, where work takes place with highly concentrated chemicals.

Figure 4:
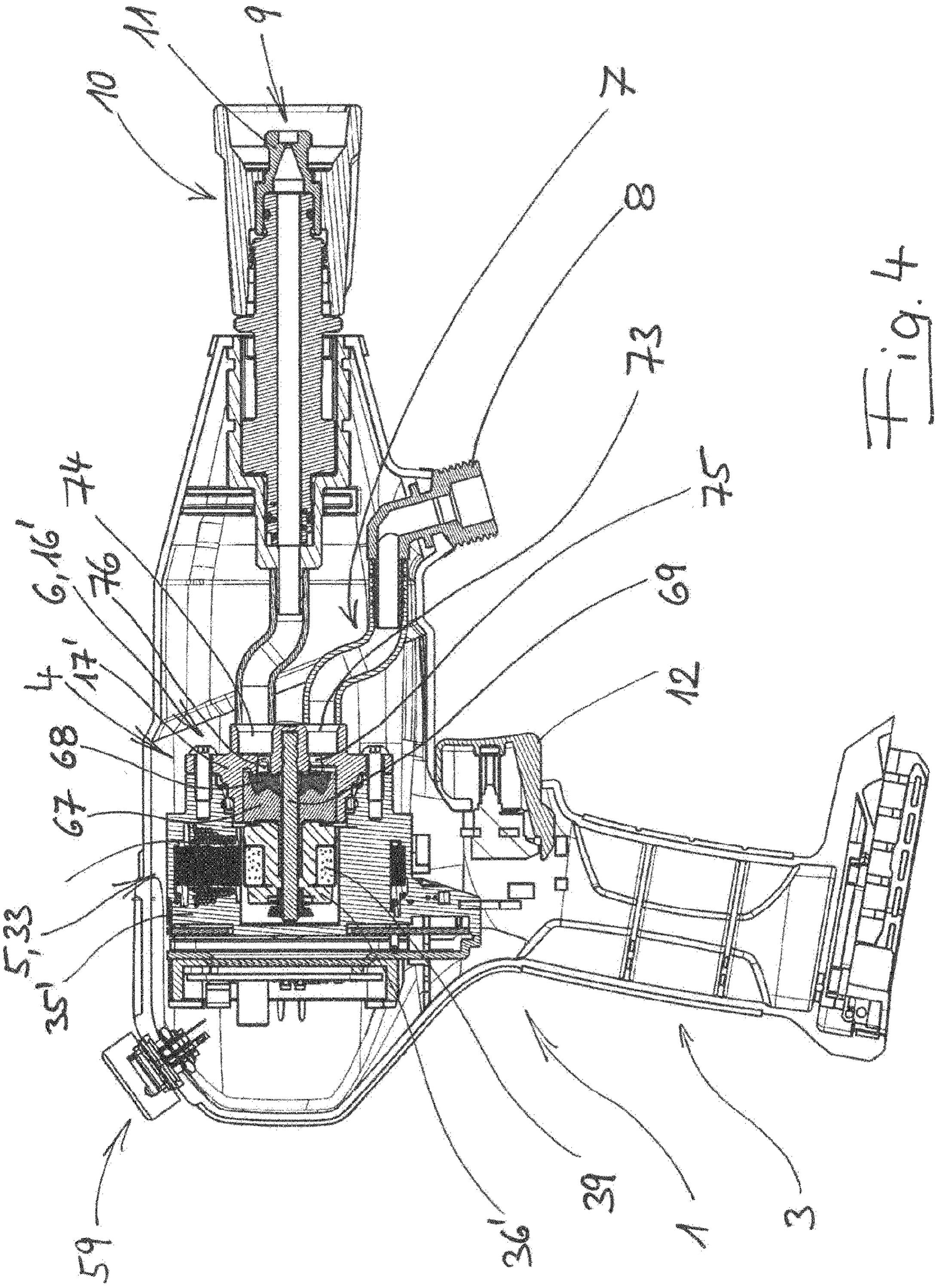
FIG. 4 shows a vertical section through the complete hand-operated pressurized-fluid cleaning device according to a second exemplary embodiment and FIG. 5 shows a section of the same in an enlarged detail diagram.
Figure 5:
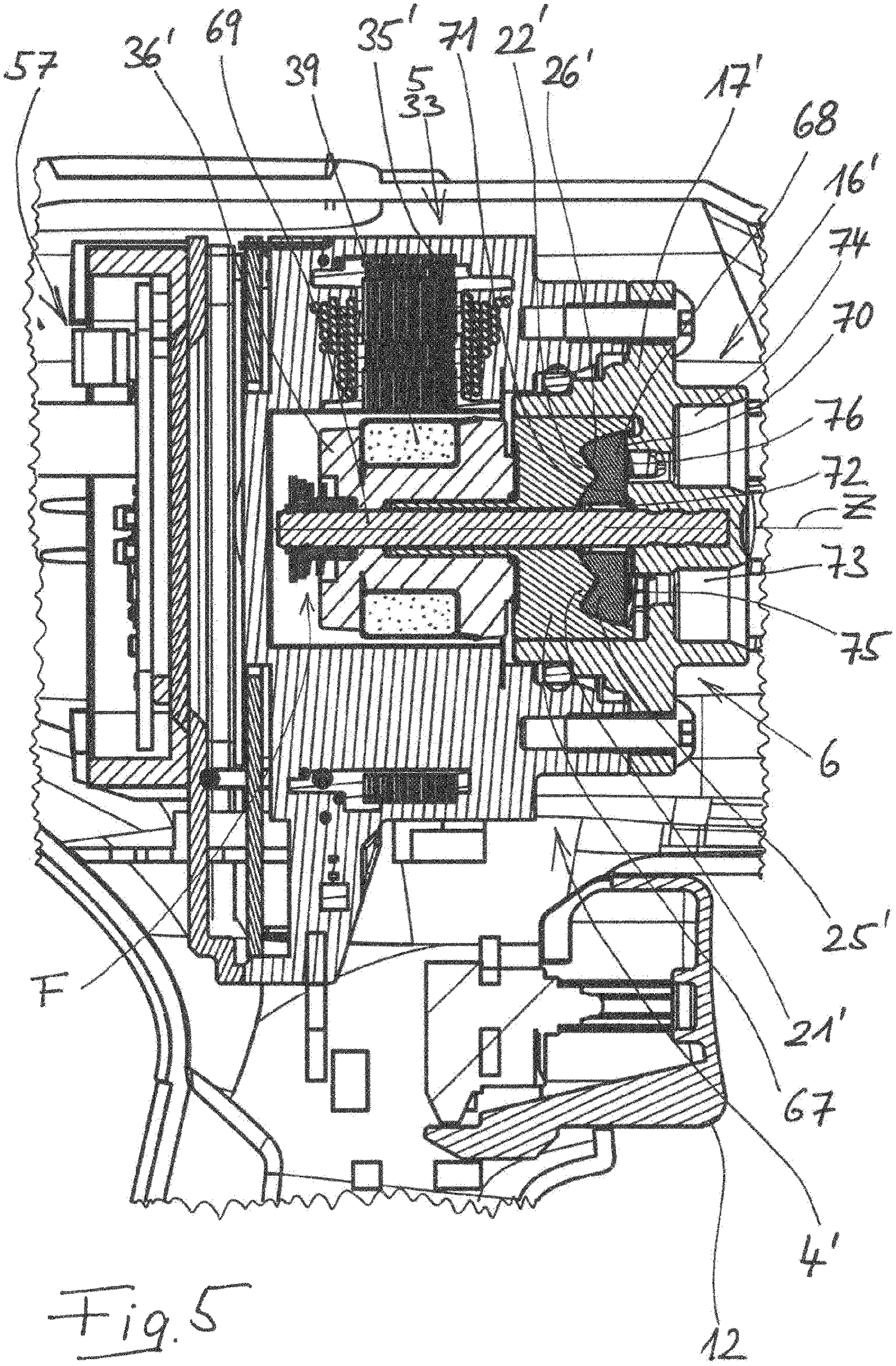

For the second exemplary embodiment of an inventive hand-operated pressurized-fluid device illustrated—without its battery—in FIGS. 4 and 5, diverse technical viewpoints and special features are already obvious to a person skilled in the art from the foregoing explanations concerning the first exemplary embodiment. Reference—in order to avoid repetitions—is made to these, wherein matching features are indicated by the use of like reference symbols.

The decisive difference of the second exemplary embodiment compared with the first exists in the construction not only of motor-pump group 4' in such a way that a wobbling motor pump 16' according to the double-rotor concept is used, but also of the installation situation achieved in this context. And, in fact, the two toothed plates 21', of wobbling-rotor pump 16' are constructed to rotate here. A driving toothed plate 21', which is part of a first pump rotor 67, is coupled in rotation with the brushless direct-current motor 33, i.e. with its motor rotor 36'. Via spur gearings 22' and 26'—which mesh with one another—it causes driven toothed plate 25', which is part of a second pump rotor 68, to move in rotation. Motor rotor 36' and first pump rotor 67 are joined as a subassembly; they rotate together around axis Z of journal 69, which is joined rigidly with pump housing 17', which in turn is joined sealingly with housing-like motor stator The rotary bearing of the subassembly comprising motor rotor 36' and first pump rotor 67 is then achieved by the pairing—forming a sliding bearing—of the cylindrical circumferential face of first pump rotor 67 and the corresponding cylindrical receiving space of pump housing 17'.

Second pump rotor 68 bears, with its end face 70 facing away from the associated spur gearing 26', slidingly on a bracing face 71, which is constructed on pump housing 17' in a manner inclined relative to axis of rotation Z of motor rotor 36' and of first pump rotor 67. It has a central penetration 72, through which journal 69 passes. A pump inlet 73 and a pump outlet 74, which respectively communicate with control openings 75 and 76 constructed on bracing face 71, are constructed on pump housing 17'. A spring F—with axial direction of action—clamped between the free end of journal 69 and motor rotor 36' ensures that first pump rotor 67 will bear with a specified force of contact on second pump rotor 68, as will the latter on pump housing 17' in the respective contact zones in question.

As regards further details of the motor-pump group used in the second exemplary embodiment, reference is made to the disclosure in German Patent Application 10 2020 124 825.3 (which was still pending as of the priority date of the present patent application) as well as to the further prior art mentioned in the introduction in reference to double-rotor wobbling-rotor pumps.

In this embodiment, motor-pump group 4' is built in with pump 6 in an orientation facing fluid outlet 9. To avoid misconceptions, reference is made to the fact that, here also, operator-control element 12 actuates a switch—not illustrated—that controls the admission of current to motor 5. Obviously it is possible if necessary, as in the first exemplary embodiment, to provide a shutoff valve also in suction duct 7 or at another suitable position, wherein this is typically unnecessary, however, precisely in pressurized-fluid devices according to the invention, designed for very low throughputs (such as approximately 100 L/h, for example), such as for dispensing disinfectants.

What is claimed is:

1. A hand-operated pressurized-fluid device comprising:

a housing structure housing a motor-pump group, the motor-pump group comprising a pump and a motor and the housing structure having a fluid inlet connected to the housing at a suction side of the pump and a fluid outlet connected to the housing at a pressure side of the pump, the fluid outlet constructed on a nozzle unit, an electrical voltage source, and at least one operator-control element acting on a power supply of the motor via the voltage source, wherein the motor of the motor-pump group is a brushless direct-current motor and the pump is a wobbling-rotor pump having two toothed plates, each respectively provided with a corresponding annular spur gearing, wherein numbers of teeth of the two spur gearings meshing with one another differ by one from one another and the toothed plates are disposed at an angle to one another and wander relative to one another in such a way that the spur gearings bound several pump spaces that become larger and smaller during pump operation.

2. The pressurized-fluid device of claim 1, wherein one of the two toothed plates is constructed on a pump stator and the other toothed plate of the two toothed plates is constructed on a pump rotor rolling in a wobbling manner relative to the toothed plate constructed on the pump stator, wherein the brushless direct-current motor acts via a wobbling head on the pump rotor, in that the wobbling head having its end face inclined relative to an axis of rotation of the wobbling head bears on the pump rotor on a side of the pump rotor facing away from the spur gearing of the toothed plate constructed on the pump rotor.

3. The pressurized-fluid device of claim 2, wherein the motor-pump group is oriented such that the motor faces the fluid outlet.

4. The pressurized-fluid device of claim 3, wherein the motor has a continuously hollow motor rotor, a hollow space of which is part of a flow pathway connecting the pump outlet with the fluid outlet.

5. The pressurized-fluid device of claim 1, wherein the two toothed plates of the wobbling-rotor pump are constructed with rotating ability, wherein one toothed plate of the two toothed plates is rotationally coupled with the brushless direct-current motor in driving relationship and the second toothed plate of the two toothed plates is thereby caused to move in rotation in driven relationship.

6. The pressurized-fluid device of claim 5, wherein the motor-pump group is oriented such that the pump faces the fluid outlet.

7. The pressurized-fluid device of claim 5, wherein the motor-pump group comprises a housing-like motor stator and a pump housing connected sealingly therewith and provided with a pump inlet and a pump outlet, wherein a fixed journal, which passes through the toothed plate rotationally coupled with the motor and at least partly through a motor rotor of the motor, is connected with the pump housing.

8. The pressurized-fluid device of claim 1, wherein the housing structure is provided with a grip structure, wherein the voltage source is disposed removably on the grip structure.

9. The pressurized-fluid device of claim 1, wherein a nozzle of the nozzle unit is removable and wherein the removable nozzle is selected from a plurality of differently constructed potential nozzles, and wherein the selected nozzle is coupled fluidically with a pressure outlet of the pump.

10. The pressurized-fluid device of claim 1, wherein the fluid outlet is constructed on a removable nozzle insert.

11. The pressurized-fluid device of claim 1, wherein the operator-control element acts on a shutoff valve, which is disposed in a flow pathway between the fluid inlet and the fluid outlet.

12. The pressurized-fluid device of claim 1, wherein the motor-pump group can be operated with variable fluid throughput.

13. The pressurized-fluid device of claim 1, wherein components disposed in a flow pathway between the fluid inlet and the fluid outlet are acid-resistant and base-resistant.

14. The pressurized-fluid device of claim 1, wherein a light source emitting in an outlet direction of the pressurized fluid is disposed on the housing structure.

15. The pressurized-fluid device of claim 1, wherein the housing structure is provided with an impact-damping surface coating at an outer surface.

16. The pressurized-fluid device of claim 12, wherein the variable fluid throughout is adjusted by a control knob.

* * * * *